(No Model.)

C. C. DEDERMICK.
WHIFFLETREE HOOK.

No. 486,280. Patented Nov. 15, 1892.

WITNESSES
Thos. Houghton.
Frank B. Marlow.

INVENTOR
Coulder Casper Dedermick,
By J. L. McFarland
His Atty.

UNITED STATES PATENT OFFICE.

COULDER CASPER DEDERMICK, OF NASHVILLE, TENNESSEE.

WHIFFLETREE-HOOK.

SPECIFICATION forming part of Letters Patent No. 486,280, dated November 15, 1892.

Application filed January 28, 1892. Serial No. 419,573. (No model.)

*To all whom it may concern:*

Be it known that I, COULDER CASPER DEDERMICK, a citizen of the United States, residing at Nashville, in the county of Davidson and State of Tennessee, have invented certain new and useful Improvements in Whiffletree-Hooks; and I do hereby declare the following to be a full, clear, and exact description of the invention, such as will enable others skilled in the art to which it appertains to make and use the same.

This invention relates to whiffletree-hooks adapted to engage with traces provided with a simple end loop, ring, or eye; and its object is to facilitate the attachment of a trace to a whiffletree and its detachment therefrom.

The invention consists in pivoting a hook to the under part of the whiffletree in such a way as that the attaching loop, ring, or eye of the trace will readily slip over the hook and upon the tree, after which the hook will fall into a vertical position by its own weight, and so prevent the trace from slipping off the tree.

Figure 1:
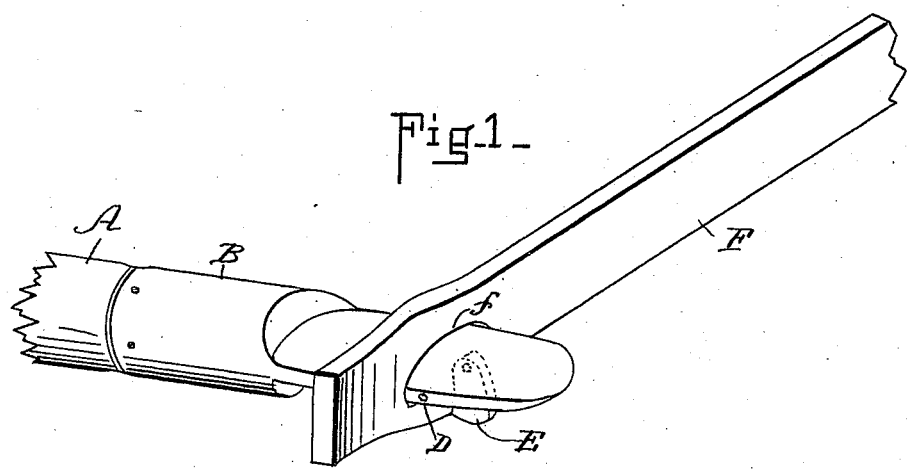
Figure 2:
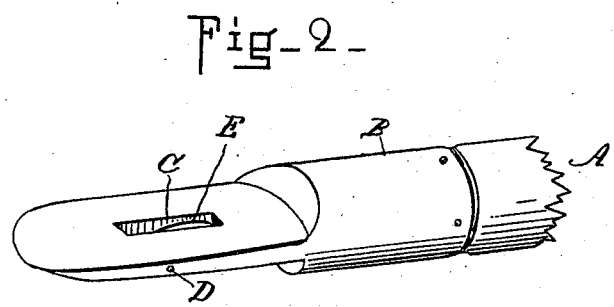
Figure 3:
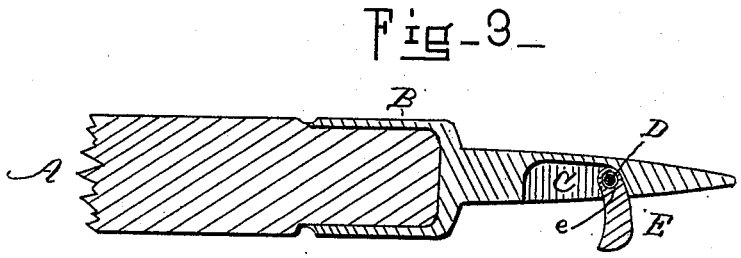

In the accompanying drawings, wherein like letters represent like parts, Figure 1 is a perspective of one end of a whiffletree, showing the trace attached and guarded by the hook. Fig. 2 is an under perspective showing the hook closed within its recess, so as to allow the trace to be slipped over it; and Fig. 3 is a vertical longitudinal section through the ferrule or end part of the tree, showing the hook pendent and pivoted to the walls of its chamber.

A is a whiffletree substantially of the construction and shape shown. B is the ferrule or end part of the tree.

C is a longitudinal and rectangular recess formed in the under part of the ferrule or end. D is a cross-bar supported at a proper depth within the recess by the side walls of the recess.

E is a hook substantially of the form shown, having an eye *e* near its head by which it is pivoted upon the cross-bar. It is evident that when left unrestrained the hook will fall into a vertical position by the weight of its free end, that it will not readily close into its recess nor remain closed therein without the application of pressure for that purpose, and that the adjacent end wall of the recess will act as a back-stop to the hook when pendent.

F is an ordinary trace, having an eye *f* sized and shaped to slip upon and along the ferrule or end of the whiffletree. If desired, a loop or ring may be attached to the end of the trace as an equivalent for the eye. In the customary play and tug of the trace it will bear against the adjacent face of the pendent hook, so that hook and trace will mutually co-operate to keep each other in position.

It is an essential of my invention that the ends of the whiffletree to which my hook shall be fitted shall be free of protuberances, whether fixed or movable, that would interfere with the easy and smooth passage of the trace-eyes over the ends to the places of engagement with the hooks; also, that the ends and upper surface of the tree should be free of slots or recesses in which water, frost, or dirt could accumulate to cause wear of parts or difficulty of attachment; also, that the hook should close completely into its recess, leaving a flush surface for the trace to pass over in reaching the place of engagement with the hook, and that nothing but the force of gravity should be necessary to enable the hook to fall into a vertical position to hold the trace in place. These essentials are all indicated by the drawings.

The simplicity of construction and arrangement, the ease, celerity, and certainty with which the trace may be attached to and detached from the tree, and the mode of attachment and detachment are so obvious as not to call for further or more particular description.

I do not claim, broadly, anything herein shown or described; but

I do claim as my invention, and desire to secure by Letters Patent, the following:

The whiffletree specified and shown, having its end sections or tips smooth and even and provided in its under face near each end of tree or tip with a deep longitudinal recess having a hook seated longitudinally and completely therein, said hook pivoted by its head near the outer wall and the roof of the recess and normally falling into and maintaining a vertically-pendent position, with a bearing against the outer wall of the recess, all in the manner and for the purposes hereinbefore fully described.

In testimony whereof I affix my signature in presence of two witnesses.

COULDER CASPER DEDERMICK.

Witnesses:
G. A. VANCE,
C. H. BERGMAN.